United States Patent [19]

Kuroda

[11] Patent Number: 4,669,019
[45] Date of Patent: May 26, 1987

[54] MAGNETIC HEAD DRUM ASSEMBLY

[75] Inventor: Masayuki Kuroda, Yokohama, Japan

[73] Assignee: Sony Corporation, Tokyo, Japan

[21] Appl. No.: 515,190

[22] Filed: Jul. 19, 1983

Related U.S. Application Data

[62] Division of Ser. No. 295,090, Aug. 21, 1981, abandoned.

[30] Foreign Application Priority Data

Aug. 30, 1980 [JP] Japan ............................ 55-120199
Mar. 9, 1981 [JP] Japan ............................ 56-33468

[51] Int. Cl.⁴ .................. G11B 15/60; G11B 5/027
[52] U.S. Cl. .................... 360/130.24; 360/84; 420/548; 428/687
[58] Field of Search ............. 360/130.21–130.24, 360/84–85, 95; 428/687; 123/193 R, 193 C; 420/534, 546, 548; 204/33, 129.7 S; 242/76; 226/190, 193

[56] References Cited

U.S. PATENT DOCUMENTS

| | | | |
|---|---|---|---|
| 3,333,579 | 8/1967 | Shockley | 123/193 R |
| 3,896,009 | 7/1975 | Kobayashi et al. | 204/33 X |
| 4,068,645 | 1/1978 | Jenkinson | 123/193 C |
| 4,155,756 | 5/1979 | Perrot et al. | 123/193 C X |
| 4,163,266 | 7/1979 | Tamamura et al. | 360/130.21 X |
| 4,366,516 | 12/1982 | Ogata et al. | 360/130.24 X |

FOREIGN PATENT DOCUMENTS

| | | | |
|---|---|---|---|
| 2840069 | 3/1979 | Fed. Rep. of Germany | 360/130.23 |
| 1396216 | 6/1975 | United Kingdom | |
| 1452780 | 10/1976 | United Kingdom | |

Primary Examiner—John H. Wolff
Assistant Examiner—David J. Severin
Attorney, Agent, or Firm—Hill, Van Santen, Steadman & Simpson

[57] ABSTRACT

The slide member contains a surface on which a sheet material travels; the surface being composed of a material containing crystals composed predominantly of Si having a size of not larger than 80 microns; the crystals being projected by approximately 0.5 to 3 microns from the surface area of the material and the Si content being in the range from the eutectic range to approximately 30% by weight. The material is a solid solution or a eutectic material containing aluminum as a major component and the crystals composed predominantly of Si. The area where the Si crystals are projected is provided concurrently with an area where the surface is planished or treated so as to give a low coefficient of surface roughness.

The slide member permits a decrease in a coefficient of friction on the surface on which the tape is travelling so that it can maintain its initial conditions for a longer period of time than conventional ones. It also possesses a remarkably high resistance to abrasion so that a pot life of the slide member is lengthened without causing the tape to deviate or depart from the original position on a tape guide or lead. Problems encountered with respect to the rubbing-off of magnetic powders from the tape can also be solved with sounds resulting from an adhesion of the tape to the slide member prevented in an efficient manner.

4 Claims, 5 Drawing Figures

MAGNETIC HEAD DRUM ASSEMBLY

This is a division of application Ser. No. 295,090, filed Aug. 21, 1981, now abandoned.

BACKGROUND OF THE INVENTION

1. Field of the Invention

The present invention relates to a slide member and, more particularly, to a slide member suitable for use in an element having a surface on which a magnetic recording medium such as a magnetic tape travels, such as a head drum assembly or a tape guide member for a video tape recorder.

2. Brief Description of the Prior Art

A material which has heretofore been employed for a slide member such as a stationary drum or a rotary drum for the head drum assembly of a video tape recorder or the like is AC8A, AC8B or AC5A of the Al-Si-Cu-Ni-Mg alloy type or the like and the sliding surface of the slide member is planished or finished so as to give a degree of surface roughness of about 1 to 3 microns on the drum surface or the tape guide surface. Where AC8A or AC8B is employed for the sliding surface of the slide member on which a magnetic tape travels, it is composed of an aluminum solid solution or a eutectic alloy and a coefficient of friction ($\mu$) on the sliding surface thereof is in the scope ranging from about 0.25 to 0.3 so that is has a longer life than AC5A. With the sliding surface composed of AC8A or AC8B, however, that portion is so soft that the surface condition such as a degree of surface roughness on the drum surface is impaired and the coefficient of friction is changed when it is operated for a long period of time. These may cause the magnetic tape to stick to the surface of the drum, whereby noises are caused to occur. In worst cases, the magnetic tape is caused to stick to the surface of a tape guide portion and to become inoperable. These are extremely unfavorable for the operation of apparatus equipped with a slide member. In instances where the surface of the tape guide portion is worn away, an extremely high precision required for positioning the magnetic tape is encountered, whereby serious problems are caused in operation. The wear of the tape guide portion or surface may cause a deviation or divergence of the traveling tape from the normal position and leads to an aberration in a state of contact of the tape edge with the tape lead of the drum so that problems with the rubbing-off of magnetic powders are encountered. Magnetic powders rubbed off from the magnetic layer of the magnetic tape may damage the slide or tape guide surface of a slide member.

The addition of Si to such materials can generally decrease the coefficient of friction. The Si content in AC5A, however, is insufficient so that it cannot permit a satisfactory effect desired by the addition of Si. In instances where materials having a lesser Si content are used for the slide member, the sliding surface tends to wear away causing an increase in the coefficient of friction. Even AC8A and AC8B which each contain a Si content greater than AC5A are insufficient in conditions under which the magnetic tape traveling on the slide member is in touch with the sliding surface thereof. It is also proposed that a beta phase having a eutectic structure between Al and Si as a major component be employed as a drum material for the peripheral drum surface portion. This drum material has a coefficient of friction of 0.22 to 0.24 when finished into a planished surface and this coefficient is somewhat lower than that of a general aluminum alloy.

Conventional materials used for the slide member usually have a too high coefficient of thermal expansion. They accordingly have some difficulty in maintaining initial conditions such as a bearing pilot pressure.

The slide member applied to the drum assembly of a video tape recorder contains a range where the Reynolds number is large and the area should be maintained in a spatial relationship from the traveling magnetic tape; otherwise, the traveling magnetic tape may be caused to stick to the surface of the drum assembly, causing noises to occur during operation of the video tape recorder. Although the slide member to be used for this purpose may preferably have a degree of surface roughness ranging from approximately 0.2 to 0.5 micron on the tape guide or sliding surface thereof, slide members composed of conventional materials fail to permit a satisfactory degree of surface roughness in association with other conditions required for drum assemblies.

OBJECTS AND SUMMARY OF THE INVENTION

Therefore, an object of the present invention is to provide a slide member alleviating or improving disadvantages and drawbacks prevailing in conventional slide members.

Another object of the present invention is to provide a slide member having a long durability.

A further object of the present invention is to provide a slide member having excellent properties with respect to resistance to friction and a so-called "fluid floating" performance as will be described hereinafter.

A still further object of the present invention is to provide a slide member having a low coefficient of friction on the sliding surface thereof particularly on which a magnetic recording medium such as a magnetic tape travels.

In accordance with the present invention, there is provided a slide member having a sliding surface, which comprises a solid solution or a eutectic material composed of aluminum as a major component and containing crystals with a size of not larger than approximately 80 microns composed predominantly of Si, in which the sliding surface of the slide member is provided with an area where such crystals are projected by a desired height from the surface of the solid solution or eutectic material or, in addition to said area, with another area where the surface is planished or surface treated to give a low degree of surface roughness, and in which the Si content is in the range from the eutectic range to approximately 30% by weight.

DETAILED DESCRIPTION OF THE PREFERRED EMBODIMENTS

The slide member in accordance with the present invention is provided with a surface area comprising a solid solution or a eutectic material which is composed of aluminum as a major component, which contains crystals with a size of not larger than approximately 80 microns consisting predominantly of Si, and in which the Si content is in the range from the eutectic range to approximately 30% by weight. The Si crystals present at the surface area are disposed to project from the solid solution or eutectic surface by a desired height.

Materials to be employed for the sliding member in accordance with the present invention may include an Al-Si series eutectic alloy or a hyper-eutectic aluminum alloy in which aluminum is contained as the major component and the Si content is in the range from the eutectic range to approximately 30% by weight. Such alloy may contain Cu, Mg, Ni and/or Ti in the total amount of approximately 0.5 to 5% by weight. The amount of Cu, Mg, Ni and Ti can be appropriately chosen within the scope set hereinabove. It is also to be understood that these alloys may contain small amounts of other elements which do not substantially impair their characteristics and performance. More specifically, one example of materials to be employed in accordance with the present invention may have the following compositions (by weight): Cu, 0.8-2.0%; Si, 22.0-24.0%; Mg, 0.5-1.5%; Zn, less than 0.3%; Fe, less than 0.8%; Mn, less than 0.3%; Ni, 0.5-1.0%; Cr, trace amount; Ti, 0.2-0.4%; and Al, balance. The amount of Al (for example, 70 to 85% by weight) may be substituted by Cu, Mg, Ni, Ti, Zn and/or the other elements by approximately 5% by weight.

Figure 1:
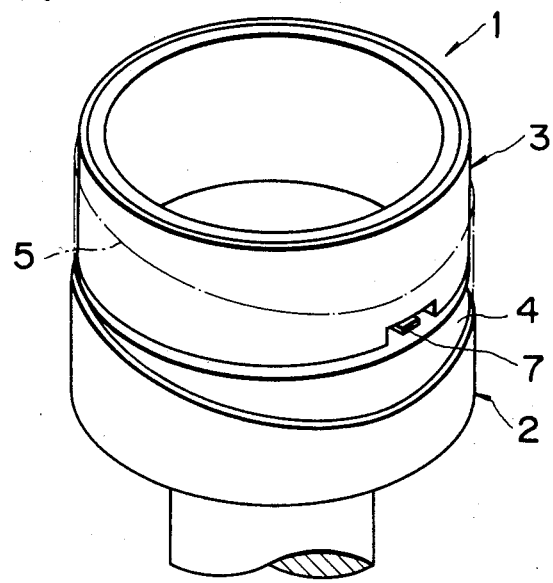
FIG. 1 is a perspective view illustrating a drum assembly for a video tape recorder, composed of the slide member in accordance with the present invention.
Figure 2:
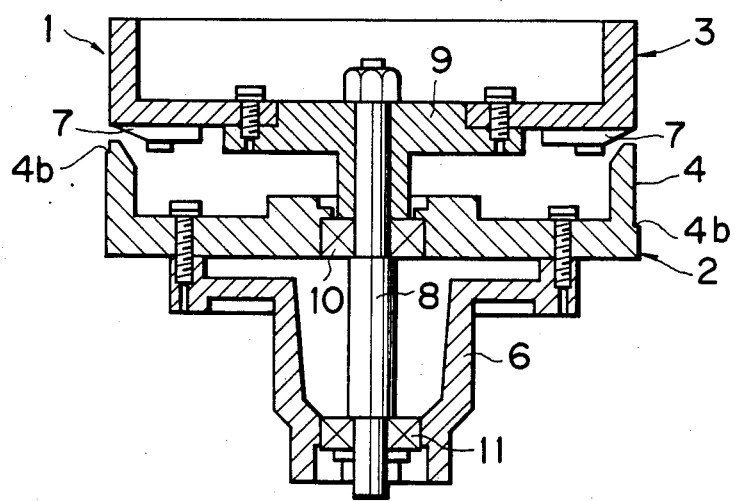
FIG. 2 is a cross-sectional view illustrating the drum assembly of FIG. 1.
Figure 3:
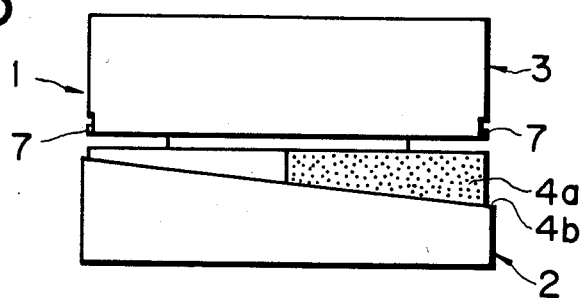
FIG. 3 is a side view illustrating one example embodying the sliding surface of the drum assembly of FIG. 1.

FIGS. 1 to 3 refer to the slide member applied to the drum assembly for a video tape recorder 1 which consists of a stationary drum 2 and a rotary drum 3. The stationary drum 2 is provided with a tape guide surface or sliding surface 4 which may be composed of such materials as hereinabove set forth so as to have a surface disposed such that crystals 15 (see FIG. 4) consisting predominantly of Si having a size of not larger than 80 microns are projected by approximately 0.3 to 3 microns from the surface area 20 (see FIG. 4) of the solid solution or eutectic material. It is herein to be noted that, merely for brevity of explanation, a mere reference to the crystals or Si crystals so projected, unless otherwise specified herein, which has been hereinbefore and will be hereinafter made, should be understood to mean the crystals composed predominantly of Si. Such area as having the Si crystals so projected may be provided as a whole on the tape guide surface of sliding surface 4 of the stationary drum 2, as best shown in FIG. 1. Such area also may be restricted to an area 4a where the traveling magnetic tape 5 is brought into touch with the sliding surface of the stationary drum, as illustrated in FIG. 3. In this case, the area may be in the scope ranging over approximately two thirds of the sliding surface where the traveling magnetic tape is rolled. The area where the crystals of Si are so projected as hereinabove set forth will sometimes be referred to as a "solid friction" area merely for brevity of explanation. Where the crystal size exceeds the upper size, they tend to be eliminated or removed by the abrasion with the traveling magnetic tape. Hollows or voids formed by the elimination or removal of the Si crystals from the surface of the solid solution or eutectic material may be stuffed with magnetic powders rubbed off from the magnetic layer of the traveling magnetic tape.

In accordance with the present invention, the tape guide surface or sliding portion 4 and 4a may be surface treated such that the Si crystals are projected from the other surface area to such a desired extent as hereinabove set forth. The surface treatment may be carried out in a conventional manner by the use of an appropriate etchant such as an alkaline etchant. As the top surfaces of the Si crystals projected should be rendered flat because they should be in touch with the traveling magnetic tape, it is preferred to flatten the top surfaces thereof prior to the surface treatment with the etchant for projecting the Si crystals. This treatment may be conducted in a conventional manner.

Further referring to FIGS. 1 to 3, the rotary drum 3 constituting the other component of the drum assembly 1 should have the traveling magnetic tape suspended or floated in a desired spatial relationship from the surface plane of the rotary drum; otherwise, the magnetic tape which is traveling thereon at a considerably high speed may cause sticking the surface thereof, leading to various problems which are not appropriate for the operation of an apparatus equipped with the slide member. During the course of the description of this specification, the property of having the traveling magnetic tape suspended from the drum surface will be referred to as a so-called "fluid floating" performance and a area provided with such property will be called a "fluid floating" area, merely for brevity of explanation. In order to give a good fluid floating performance on the slide member, the surface may be planished or surface treated so as to give a degree of surface roughness in the scope ranging from approximately 0.2 to 0.5 micron. At the inlet portion or nearby portion where the traveling magnetic tape starts loading on and around the stationary drum, there are cases where the tape is brought into contact with the drum surface, the upper portion of the drum surface corresponding to the upper part of the tape is also planished or surface treated in substantially the same manner as the other areas.

Turning now to FIG. 2, mention will be made of the slide member in accordance with the present invention applied to the drum assembly for use with a video tape recorder. As hereinabove set forth, the drum assembly 1 consists of the stationary drum 2 and the rotary drum 3. The stationary drum 2 provided with a tape guide 4b is fixed to a casing 6 held by a chassis (not shown) through a bracket (not shown). The rotary drum 3 is provided with a pair of magnetic heads 7 arranged under the lower surface of the drum so as to project each of their tips from the outer periphery or surface plane of the drum, whereby the traveling magnetic tape can also float or remain suspended in a predetermined spatial relationship from the surface thereof. The rotary drum 3 is fixed to a rotary shaft 8 through a supporting member 9 which is rotatably supported by bearings 10 and 11, the bearing 10 being in engagement with the stationary drum 2 having the tape guide 4b, as also shown in FIGS. 1 and 2, and the bearing 11 being in engagement with the casing 7.

The present invention will be described more in detail by way of an example.

EXAMPLE 1

Figure 4:
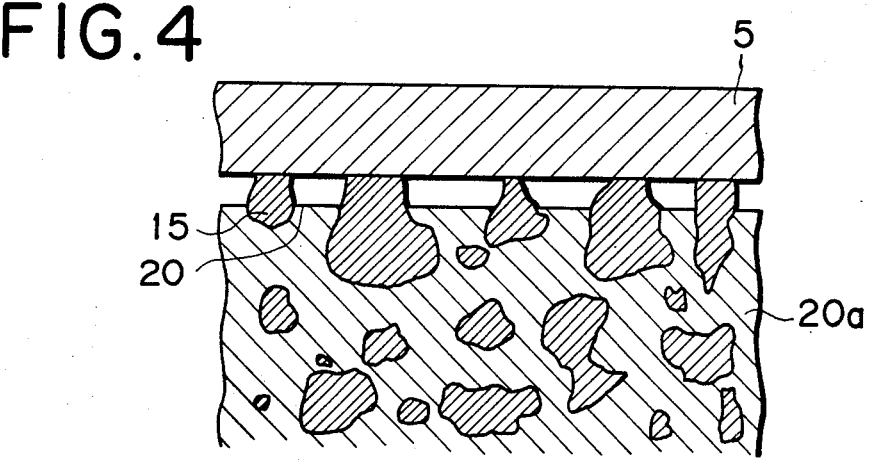
FIG. 4 is an enlarged cross-sectional view illustrating the area of the sliding surface of the slide member, where the crystals are projected from the surface of the solid solution or eutectic material.
Figure 5:
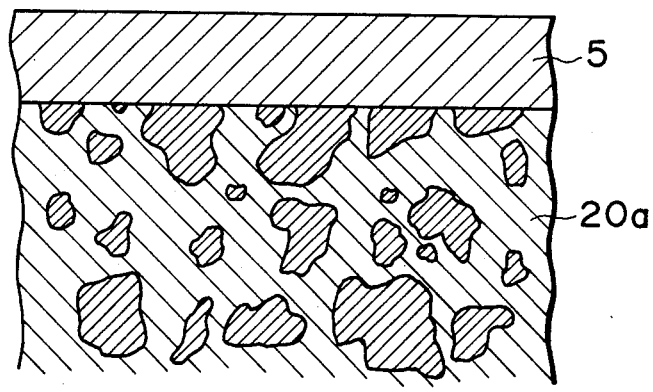
FIG. 5 is an enlarged cross-sectional view illustrating the surface state of a planished surface which may be provided in addition to the area having the projected crystals.

Material used for the preparation of a drum assembly was an alloy of a solid solution containing aluminum as a major component, having the following composition (by weight): Cu, 1.3%; Si, 22.2%; Mg, 1.3%; Zn, 0.0081%; Fe, 0.29%; Mn, 0.0049%; Ni, 0.8%; Cr, 0.0037%; Ti, 0.23%; and Al, 73.2%. The solid solution had a Vickers hardness of 70 to 80 for the matrix portion (20a; FIGS. 4 and 5) and the Si crystals contained therein and projected therefrom had a Vickers hardness of 500 to 800. The stationary drum was prepared in the structure as hereinabove mentioned and referred to FIG. 5, using the material having the aforesaid composition, by surface treating the tape guide surface with an alkaline etchant to etch the aluminum solid solution portion while the hard Si crystals remained unetched to project them by about 2 microns from the solid solution surface and with a fineness of powder of the Si crystal of about 30 to 80 microns.

This drum was assembled with a rotary drum having a planished surface to provide a drum assembly which was then tested for a degree of abrasion by running the magnetic tape for 4,000 hours. It was found from this test that the degree of abrasion was less than 0.2 micron and no noises resulting from the vibration of the magnetic tape on the drum surface because the tape guide surface had a low coefficient of friction.

EXAMPLE 2

The drum assembly was assembled in substantially the same manner as in Example 1 with the exception that the stationary drum applied in this example was one prepared by providing two areas on the tape guide surface, the one being an area where the Si crystals are projected in substantially the same manner as in Example 1 and the other being an area where the surface is planished. It was also found that this drum assembly could exhibit the effects as obtained by the drum assembly of Example 1.

The slide member in accordance with the present invention permits a decrease in a coefficient of friction on the surface on which the magnetic tape is traveling so that it can maintain its initial friction conditions and prevent the traveling magnetic tape from generating noises resulting from an increase in the coefficient of friction as well as ease vibration phenomena such as a jitter. As the slide member in accordance with the present invention has a high Si content on the surface on which the magnetic tape travels, a resistance to abrasion is rendered so remarkably high that the life of the slide member is lengthened to an extremely long period of time and simultaneously the period of time required for the replacement of the slide member is delayed to a remarkable extent. As the fluid floating conditions can be maintained for a long period of time, the slide member permits a safe and stable guidance of the magnetic tape traveling thereon, causing no damage on the surface thereof. These properties also serve as lengthening the life of this slide member and problems with the rubbing-off of magnetic powders from the magnetic tape encountered during operation can also be alleviated. Furthermore, the slide member of the invention permits a decrease in a coefficient of thermal expansion so that a precision required for the drum assembly or tape guides can also be maintained. It is further stable against variations in physical conditions such as temperatures, moisture and the like, whereby adhesion of the tape on the surface of the slide member and noises resulting therefrom can be efficiently prevented.

What is claimed is:

1. A magnetic head drum assembly comprising first and second cylindrical drums coaxially supported to form a composite guiding surface for a traveling magnetic recording medium, said first and second drums being spaced by an axial gap, at least one magnetic head extending into said axial gap and arranged to contact a traveling magnetic recording medium on said guiding surface, at least a portion of said guiding surface being composed of an aluminum-silicon alloy having predominantly silicon crystals dispersed therein, said crystals having a size not larger than 80 microns and projecting by about 0.5 to 3 microns from the aluminum-silicon alloy guiding surface, said silicon crystals having a hardness substantially greater than the hardness of the alloy from which they project, the silicon content of said alloy being in the range from the eutectic concentration to approximately 30% by weight.

2. A magnetic head drum assembly according to claim 1 wherein said first drum is rotatable relative to said second drum, at least a surface of said first drum being composed of an aluminum-silicon alloy having predominantly silicon crystals dispersed therein, said crystals having a size not larger than 80 microns and projecting by about 0.5 to 3 microns from said aluminum-silicon alloy surface of said first drum, said crystals having flat surfaces arranged to contact said magnetic recording medium, the silicon content of said alloy being in the range fromt he eutectic concentration to approximately 30% by weight.

3. A magnetic head drum according to claim 1 in which said guiding surface on said second drum has a surface roughness of not more than 0.5 micron.

4. A magnetic head assembly according to claim 3 in which said surface roughness is in the range from 0.2 to 0.5 micron.

* * * * *